US009819623B2

United States Patent
Gunaratnam

(10) Patent No.: US 9,819,623 B2
(45) Date of Patent: Nov. 14, 2017

(54) PROBABILISTIC ROUTING OF MESSAGES IN A NETWORK

(71) Applicant: ORACLE INTERNATIONAL CORPORATION, Redwood Shores, CA (US)

(72) Inventor: Vasanthan Gunaratnam, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 483 days.

(21) Appl. No.: 13/949,699

(22) Filed: Jul. 24, 2013

(65) Prior Publication Data

US 2015/0032826 A1   Jan. 29, 2015

(51) Int. Cl.
| | | |
|---|---|---|
| G06F 15/16 | (2006.01) | |
| H04L 12/58 | (2006.01) | |
| H04L 29/08 | (2006.01) | |
| H04L 29/06 | (2006.01) | |

(52) U.S. Cl.
CPC .............. *H04L 51/14* (2013.01); *H04L 51/32* (2013.01); *H04L 65/403* (2013.01); *H04L 67/22* (2013.01); *H04L 67/306* (2013.01)

(58) Field of Classification Search
CPC ......... H04L 51/14; H04L 51/32; H04L 51/12; H04L 51/24; H04L 51/26; H04L 67/22; H04L 67/306; H04L 65/403; G06Q 10/10; G06Q 10/107; G06F 17/3053
USPC ..... 709/206, 204, 207, 205, 224; 705/14.43, 705/401; 706/12; 707/723, 748
See application file for complete search history.

(56) References Cited

U.S. PATENT DOCUMENTS

| | | | | |
|---|---|---|---|---|
| 2006/0143140 A1* | 6/2006 | Stemmle | .............. | G06Q 10/107 705/401 |
| 2009/0094340 A1* | 4/2009 | Gillai | .................... | G06F 15/16 709/206 |
| 2009/0313343 A1* | 12/2009 | Brady | ................. | G06F 17/2785 709/206 |
| 2009/0313346 A1* | 12/2009 | Sood | ...................... | G06Q 10/10 709/207 |
| 2011/0055000 A1* | 3/2011 | Zhang | .................. | G06N 99/005 705/14.43 |
| 2011/0087744 A1* | 4/2011 | Deluca | ................. | G06Q 10/107 709/206 |
| 2011/0246584 A1* | 10/2011 | Vitaldevara | .......... | G06Q 10/107 709/206 |

(Continued)

*Primary Examiner* — Jungwon Chang
(74) *Attorney, Agent, or Firm* — Cooper Legal Group, LLC

(57) ABSTRACT

Systems, methods, and other embodiments associated with routing messages in a network are described. In one embodiment, a method includes acquiring engagement information about each of a plurality of individuals that are members of a network associated with a user. The engagement information is acquired as a message is received from the user. The method may also include analyzing the network and the engagement information using a set of predefined metrics to determine a probability that each of at least a subset of the plurality of individuals will respond to the message. The method may also include routing the message to at least one individual in the subset as a function of the probability that each of at least a subset of the plurality of individuals will respond.

18 Claims, 4 Drawing Sheets

(56) References Cited

U.S. PATENT DOCUMENTS

| | | | |
|---|---|---|---|
| 2012/0131107 A1* | 5/2012 | Yost | G06Q 10/107 709/206 |
| 2012/0254080 A1* | 10/2012 | Bhatnagar | G06N 7/005 706/12 |
| 2014/0365584 A1* | 12/2014 | Abali | G06F 17/3053 709/206 |
| 2015/0281162 A1* | 10/2015 | Shen | H04L 51/26 709/206 |

* cited by examiner

PROBABILISTIC ROUTING OF MESSAGES IN A NETWORK

BACKGROUND

Technology provides many new ways to contact and connect with family, friends, co-workers, caregivers, and even professional service providers. Often, a user is connected to these different individuals through a social or professional network. The network may be implemented as a standalone service or can be as simple as a contact list in a smart phone. A user may, in general, interact with individuals in the network by broadcasting electronic messages or posting messages to the network. However, interacting with the network in this way can lead to an overwhelming number of messages being directed to each individual in the network. The overwhelming number of messages occurs when not only the user but other users in the network are posting/sending messages. As a result, many messages that are not all relevant to each individual are, nonetheless, being sent to each individual.

As a consequence of the multiplicity of messages, individuals in the network may suffer from alert fatigue causing them to ignore or not respond to messages. Alert fatigue occurs when an individual no longer views or responds to messages because they receive so many messages that are irrelevant. Additionally, when a message is relevant to an individual, the message may still be sent to them even though they are presently indisposed thus compounding the alert fatigue. Difficulties with alert fatigue and messages that do not account for availability of the recipient can cause even greater difficulties when, for example, the messages are emergency messages and/or are messages of a high importance.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
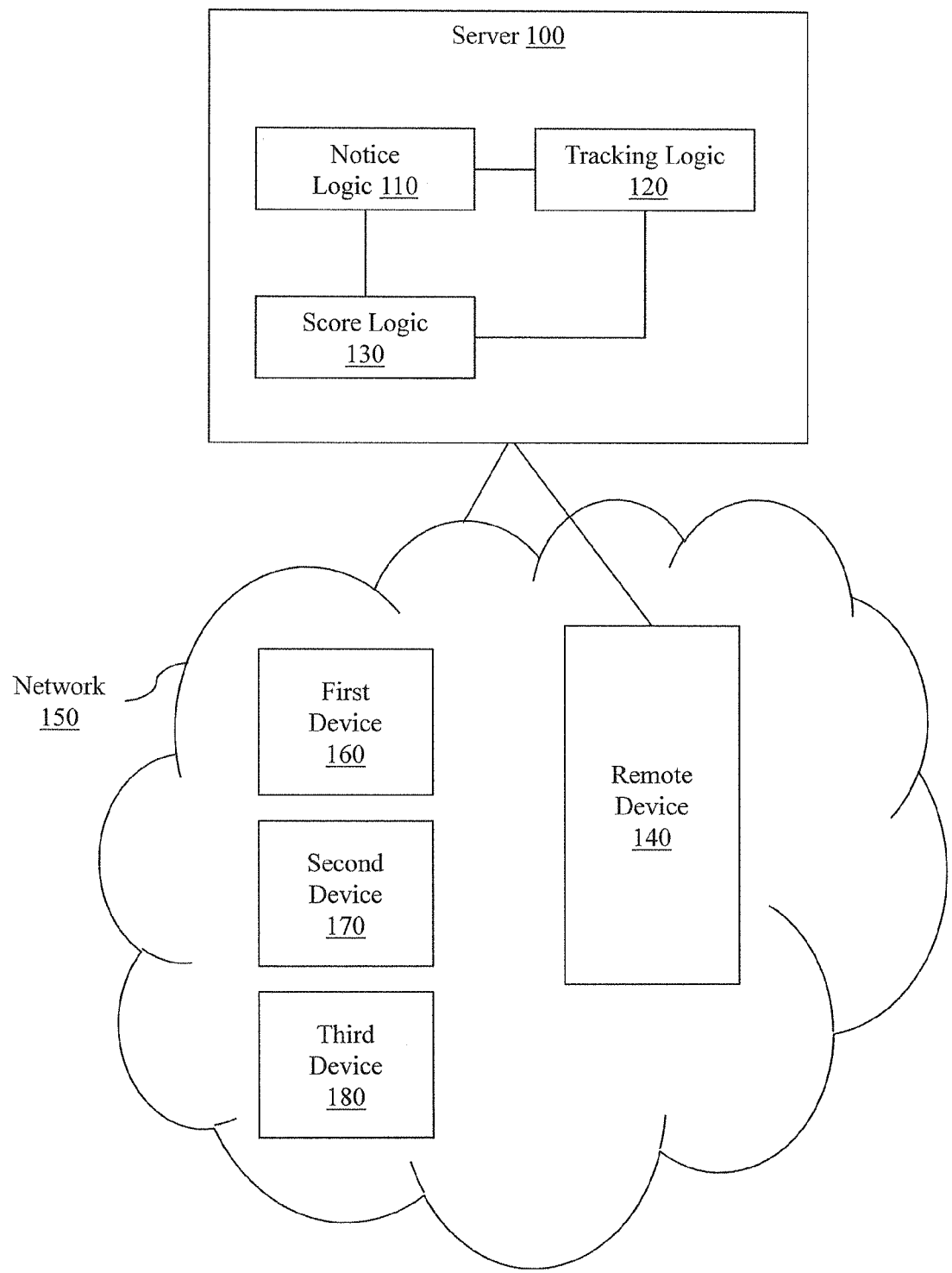
FIG. 1 illustrates one embodiment of a system associated with intelligently routing messages in a network using engagement information.

Systems, methods and other embodiments are described herein that are implemented to intelligently route messages to relevant recipients. Consider that a person may be a member of many different networks with each network including many individuals (e.g., hundreds or even thousands of people). The different networks may be social networks, professional networks, and so on. In general, the person and the individuals interact and communicate using the network to send and receive messages. The messages may be broadcast to all individuals in a network, directed to smaller subgroups, or directed to a single individual in the network. Additionally, the messages may be about many different topics including personal or business topics, and/or the messages may even be emergency messages (e.g., related to a medical emergency, other event emergency, a time critical message, etc). Thus, either inherently or as devised, the messages have different associated relevancies and immediacies for each different recipient that receives the messages. In either case, messages from different individuals in the network(s) combine into a large volume of messages that continuously alert recipients.

Consequently, recipients are likely to ignore messages or not respond from fatigue that results when receiving too many messages (e.g., especially when a significant number of messages are irrelevant). Additionally, even when a message is relevant to the recipient, the recipient may be unable to respond because of their current status (e.g., driving, in a meeting, on vacation, not available, or otherwise not able to respond to a message). Thus, even relevant messages can go unanswered and can compound fatigue from a high message volume when a recipient is indisposed.

Further consider that some messages have a higher priority or immediacy according to the content of the messages. For example, a message may be auto-generated when a patient misses taking a medication. The message may be auto-generated by an electronic device configured to monitor the patient, where the message is sent to a caregiver system via a network. However, if the caregiver is continuously receiving large volumes of messages, then the message may be overlooked or ignored even though it is highly relevant to the caregiver. Thus, the patient may not receive proper care in a timely manner. While a patient/caregiver relationship is discussed, this is just one example of how important messages can be ignored and go unanswered when a recipient becomes overwhelmed from receiving a large volume of electronic messages.

Accordingly, in one embodiment as described herein, a system is configured to control the distribution and routing of electronic messages over a communication network so that messages are routed to recipients that are most likely and/or capable of responding. A recipient that is most likely to respond may be determined as a function of information that is known about the recipient (e.g., engagement information and contextual information about the recipient). In this way, messages are transmitted to fewer individual recipients but with a greater confidence that the messages are relevant to the individual recipients. Accordingly, messages are intelligently routed instead of being blindly broadcast without regard to a likelihood of a recipient responding or the recipient's status.

With reference to FIG. 1, one embodiment of a server 100 associated with intelligently routing messages to relevant recipients is illustrated. In one embodiment, the server 100 includes notice logic 110, tracking logic 120, and score logic 130. The server 100 is a computer or other electronic device that includes at least a network interface for communicating with a network 150. The server 100, for example, can receive messages from a remote device 140 that is part of the network 150.

In one embodiment, the network 150 is a social network, a professional network, emergency responder network, patient/caregiver network, consumer/advertiser network, a contact list, or more generally any network that includes a collection of individuals that are associated with each other and interact with each other using electronic messages. Accordingly, individuals in the network 150 communicate using electronic devices (e.g., remote device 140, first device 160, second device 170, third device 180, etc.) via an associated communication network such as the Internet or another communication medium (e.g., public switched telephone network (PSTN), cellular network, and so on) that permits transmission and reception of electronic messages. As used in this disclosure, the term "network" generally refers to a collection of individuals and relationships between the individuals, which may also be referred to as, for example, a social network. Accordingly, members of the network communicate using one or more communication networks (e.g., cellular network) that are distinct from the network (i.e., social network).

The remote device 140, the first device 160, the second device 170 and the third device 180 are examples of devices used by individuals in the network 150 to communicate electronically with other individuals in the network 150. These devices can be, for example, a computer, a pager, a cellular telephone, a smartphone, a laptop, a tablet computer, or another electronic device that is capable of sending and receiving electronic messages. Additionally, the devices in the network 150 may include one or more executing applications that feed streams of engagement/contextual information about a user back to the server 100. That is, the devices (e.g., the remote device 140, the first device 160, etc.) include, for example, global positioning system (GPS) applications for providing location data, calendar applications for providing schedule data, logging applications for providing different tracking data about actions of a user, logging applications for providing different data about a status of a user, and so on. Accordingly, the server 100 may use the engagement/contextual information when determining where to route a message.

In general, the remote device 140 and other devices in the network 150 exchange the electronic messages via the server 100, which serves as a centralized distribution point for the electronic messages. The server 100 may be part of the communication network or a separate standalone service. In either case, the server 100 is a computer that receives and processes communications from devices (e.g., the remote device 140, the first device 160, etc.) communicating in the network 150. Additionally, the electronic messages are, in one embodiment, addressed to the server 100 and not specific individuals in the network 150. In another embodiment, the messages are addressed to a specific list or individual specified in the electronic messages.

However, in both instances the server 100 receives the messages and forwards/routes the messages to individuals according to an assessment of which individuals are most likely and/or most capable of responding to the message. Thus, the server 100 either independently determines which individual(s) to forward the electronic messages according to an alert table or other list or the server 100 changes a recipient list already specified in the electronic messages to re-direct the electronic messages.

Consider an example where the network 150 is a patient/caregiver network. Accordingly, the server 100, the remote device 140, and other devices communicate electronically in the network 150 and/or transmit and receive notices about patients. The network 150 defines relationships between individuals. For example, in the patient/caregiver network, the individuals are patients and caregivers (e.g., doctors, nurses, and so on). Accordingly, the network 150 includes many different patients and caregivers. However, not all of the patients and caregivers are directly associated.

For example, the network 150 may be a patient/caregiver network for a hospital system. Accordingly, a patient in the hospital system may be linked to several nurses, doctors, administrators, and potentially even other patients through links/associations defined by the network 150. However, the individual patient may not share links or associations with all nurses in the network 150 or, for example, to other patients. Instead, each patient and caregiver has a personalized sub-network that is part of the larger network 150 and includes associations to other patients/caregivers in the network 150 that are individually relevant. Therefore, other individuals that are a part of the network 150 and are not directly linked or associated with an individual are separated by one or more degrees of separation but are still part of the network 150. Similarly, in other types of networks (e.g., social, professional, and so on) many individuals are members of the network, but not all members share direct links or associations in a similar way. Accordingly, the network 150 may be conceptualized as a web with different individuals at each point and connections between points as the links or associations between individuals.

Continuing with the patient caregiver example, the patients and caregivers may use the network 150 to communicate messages about appointments, procedures, medications, events, health alerts, and so on. Further consider that the remote device 140 is associated with a patient. In one example, when the patient misses a scheduled medication dose the remote device 140 automatically generates and sends a message about the missed dose. The remote device 140 addresses the message to the server 100 and then transmits the message to the server 100 for forwarding to one or more recipients.

Traditionally, the server 100 may have simply forwarded the message to all of the patient's caregivers, to one or more on-duty caregivers, or to recipients specified (e.g., a list or individual recipients) in the message. However, forwarding messages in this way often leads to an overwhelming number of messages provided to recipients and also does not guarantee that any of the recipients are available and can/will respond.

Thus, the server 100 is configured to intelligently route the messages to recipients to improve message distribution in the network 150. For example, the notice logic 110 is configured to receive messages from electronic devices (e.g., the remote device 140) in the network 150. In one embodiment, a message indicates an occurrence of an event and is auto-generated by the remote device 140 and sent to the server 100. In another embodiment, the message is a communication (e.g., text message), an alert, or other notice that is either auto-generated or manually generated by a user of the remote device 140. For example, the event may be a medical emergency, a medical notification, an emergency notification or more generally any event for which a message to a member of the network 150 is generated. Additionally, the message is addressed and sent directly to the server 100 as a notification to a service (e.g., medical network service) or the message is addressed to a specific individual or list of individuals and is sent to the server 100 for distribution. In either case, the message is received by the notice logic 110 of the server 100 for forwarding to one or more recipients.

The server 100 uses information about individuals in the network 150 to determine to whom to intelligently route the message. For example, the tracking logic 120 acquires engagement information about individuals (e.g., individuals specified by the message and/or individuals associated with the sender) in the network 150. In one embodiment, the engagement information includes contextual information, a response history that indicates how many times an individual has responded to previous messages, a check rating that indicates a history of how quickly an individual has checked previous messages, and a relationship (e.g., friend, coworker, caregiver, etc.) to the user as defined by the network 150 or any combination of these elements. The contextual information includes, for example, a status (e.g., busy, available, etc.) of individuals in the network 150, a location of individuals (e.g., global positioning system (GPS) coordinates or a basic indicator of location (i.e., at work, at home, etc.)), an availability of individuals according to a calendar (e.g., personal and/or work calendar) of scheduled events, and so on.

In general, the tracking logic 120 is configured to dynamically and continuously gather the engagement information about each individual in the network 150. That is, before even receiving the message, the tracking logic 120 is collecting the engagement information from individuals in the network 150 by monitoring activities of the individuals. The tracking logic 120 may monitor the individuals by receiving streams of information from electronic devices (e.g., 140, 160-180) of each individual about different tasks and actions. In one embodiment, the tracking logic 120 continuously maintains statistical information about different actions of the individuals in the network 150. For example, the tracking logic 120 is configured to log different actions (e.g., phone calls, text messages, responses to messages, and so on) taken by each individual in the network 150 through devices associated with the individuals. Additionally, the tracking logic 120 is configured to log different attributes about each action (e.g., length of calls, time to reply to messages, how often an individual responds to messages, length of time to check a newly received message, and so on).

However, upon receiving a message, the tracking logic 120, for example, updates the engagement information or checks for updates to the engagement information. In one embodiment, the tracking logic 120 updates engagement information for individuals (i.e., a sub-group) associated with a sender of the message. For example, some types of the engagement information change more frequently than other types of the engagement information. Consider the contextual information as an example. The contextual information includes time sensitive information such as GPS coordinates and current status information. Accordingly, the tracking logic 120 is configured to update the contextual information in real-time as the message is received from the user/sender. In this way, the tracking logic 120 is able to maintain the engagement information and more specifically the contextual information as up-to-date as possible in order to ensure that the message can be routed accurately.

The engagement information is used by the score logic 130 to produce response scores. The score logic 130 analyzes the engagement information and produces the response scores as an indicator for each individual of how likely/capable each individual is to respond to the message. The score logic 130 produces the response scores for at least a subset of individuals in the network 150. That is, in one embodiment, the score logic 130 produces the response scores for possible recipients of the message. The possible recipients are, for example, individuals in a sub-group of the user that are associated with or linked to the user in the network 150. In another embodiment, the possible recipients are individuals that are presently on duty (e.g., caregivers, emergency responders, and so on) or members of a list or group specified as recipients in the message.

Accordingly, the score logic 130 is configured to produce the response scores by, for example, analyzing the engagement information using a set of predefined metrics. In one embodiment, the score logic 130 also analyzes the network 150 along with the engagement information to produce the response scores. That is, the score logic 130 considers relationships between the user and individuals in the network 150 along with other characteristics defined by the network 150 to produce the response scores. In one embodiment, the score logic 130 uses an alert table that indicates for each alert which metrics and engagement information to use to determine the response scores. The alert table may also indicate which individuals to calculate the response scores for or which relationships to a sender are eligible recipients.

For example, the score logic 130 is configured to calculate the response scores from the engagement information (e.g., response history and current status) for individuals that are defined with a specific relationship (e.g., caregiver) to the user. In one embodiment, the alert table also indicates a level of influence to qualify as a possible recipient (e.g., physician=high, nurse=medium, family=low, etc.). For example, depending on an importance of a notification, simply being defined as a caregiver may not qualify an individual as a possible recipient. Instead, an individual may also need to be ranked, for example, as at least a medium influence level.

The score logic 130 uses one or more functions that define heuristics or statistical relationships based on the engagement information to determine a likelihood/capability of each individual in the network responding to the message. The score logic 130 then ranks the subset of individuals according to the response scores to provide a priority ranking or list that orders individuals according to which are the most likely to respond to the message.

Continuing with the previous example where the network 150 is a patient/caregiver network, consider that the patient is the user of the remote device 140. The network 150 includes caregivers (e.g., nurses and doctors) of the patient. Further consider that the first device 160 is associated with a caregiver A, the second device 170 is associated with a caregiver B, and the third device 180 is associated with a caregiver C. In this example, the contextual information that is part of the engagement information includes availability of each of the caregivers and how frequently each of the caregivers respond to messages.

Accordingly, the tracking logic 120 continuously monitors each device associated with the caregivers to collect statistics for determining how frequently each of the caregivers respond to messages. For purposes of illustration, consider that caregiver A responds 50% of the time (i.e., $x=0.5$), caregiver B responds 100% of the time (i.e., $x=1$), and caregiver C responds 30% of the time (i.e., $x=0.3$). Further consider that the patient suffers a seizure and thus the remote device 140 transmits a message to the server 100 upon the occurrence of the seizure. Upon receiving the message, the tracking logic 120 checks the availability of each of the caregivers from calendar applications on the first device 160, the second device 170, and the third device 180. Consider that the tracking logic 120 determines that neither caregiver A or B have any meetings presently scheduled. Accordingly, an availability of caregivers A and B is indicated as available (i.e., $y=1$). However, the calendar application for caregiver C on the third remote device 180 indicates that caregiver C is currently in a meeting. Therefore, the availability of caregiver C is indicated as busy or unavailable (i.e., y=0).

Using the monitored and collected engagement information, the score logic 130 applies a probability function to the engagement information to determine a response score for each individual that is a possible recipient of the message. The response score indicates a likelihood that each of the caregivers will respond to the message. The probability function may be as follows:

$$p=f(x,y)=xy \quad \text{Equation (1)}$$

Caregiver A, p=0.5*1=0.5
Caregiver B, p=1*1=1.0
Caregiver C, p=0.3*0=0
Priority Ranking: (1) Caregiver B, (2) Caregiver A, (3) Caregiver C Accordingly, caregiver A is 50% percent likely to respond to the message, caregiver B is 100% likely to respond, and caregiver C is 0% likely to respond to the message. Thus, the score logic 130 ranks caregiver B as the most likely to respond and caregiver C as least likely to respond. Consequently, the notice logic 110 selects the most likely individual to respond from the priority ranking and forwards the message to the individual (i.e., caregiver B). In one embodiment, the notice logic 110 is configured to forward the message to an individual that is most likely to respond (e.g., caregiver B) by routing the message to an electronic device (e.g., cellular telephone, pager, etc.) associated with the individual. In the instant example, the notice logic 110 sends the message to the second device 170 that is associated with caregiver B. While the score logic 130 is discussed as determining a probability of each individual responding to the message, of course, in other embodiments, the score logic 130 is configured to determine a capability of an individual to respond, or another statistical likelihood associated with possible recipients and route the message accordingly.

Additionally, in one embodiment, the notice logic 110 is configured to check whether or not the individual that received the message has responded to the message. The notice logic 110 is configured to monitor whether the individual has checked the message on the associated electronic device and has responded to the message. If the individual has not checked and/or responded to the message within a predetermined time (e.g., 15 minutes), then the notice logic 110 forwards the message to a next individual in the priority ranking. The notice logic 110 may repeat sending (i.e., forwarding) the message until an individual responds to the message. Alternatively, the notice logic 110 may forward the message to the same individual after the predefined period of time to re-alert the individual. In this way, the notice logic 110 routes messages to individuals that are most likely to respond and when an individual does not respond ensures that the message is re-routed.

Figure 2:
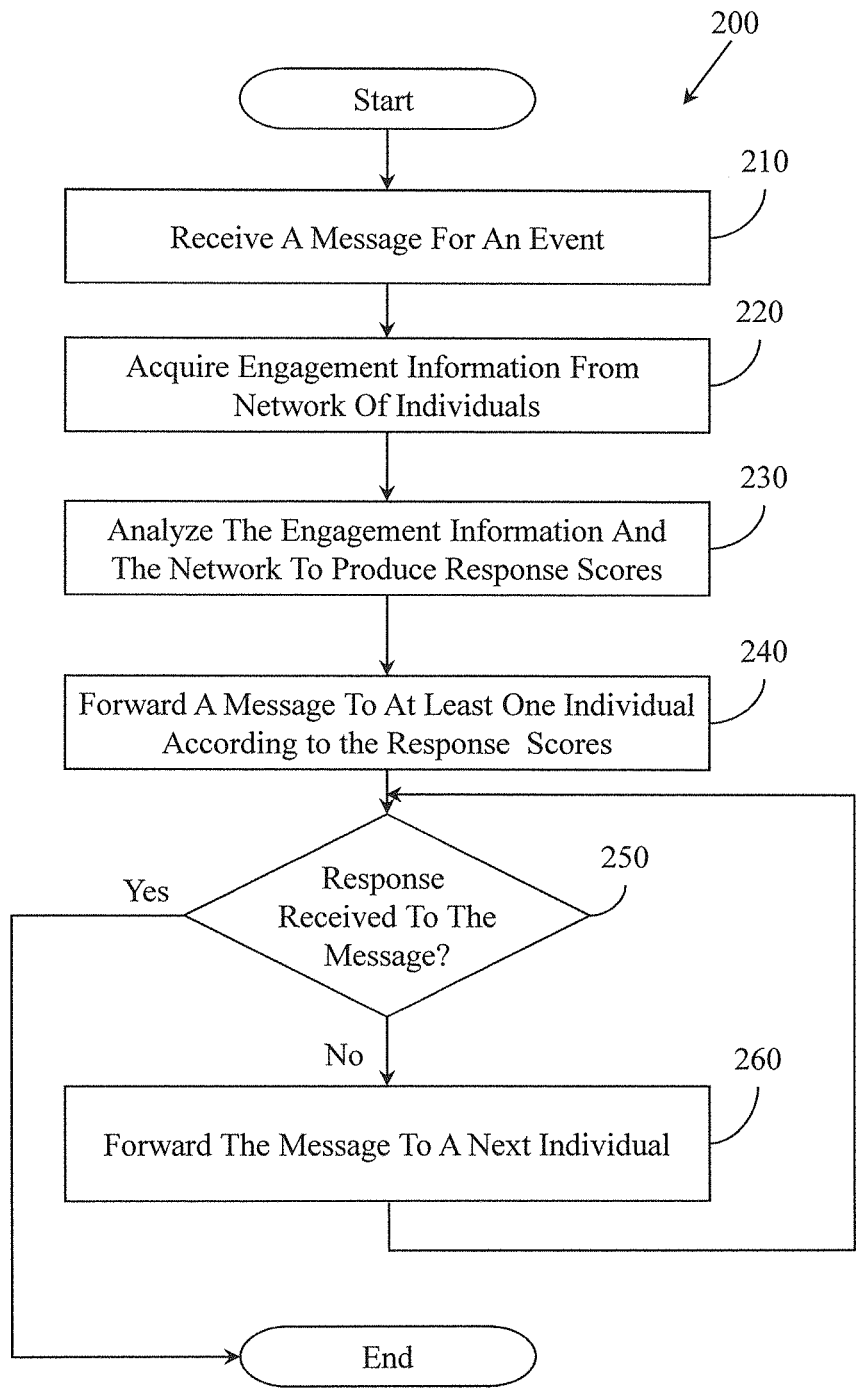
FIG. 2 illustrates one embodiment of a method associated with intelligently routing messages in a network using engagement information.
Figure 3:
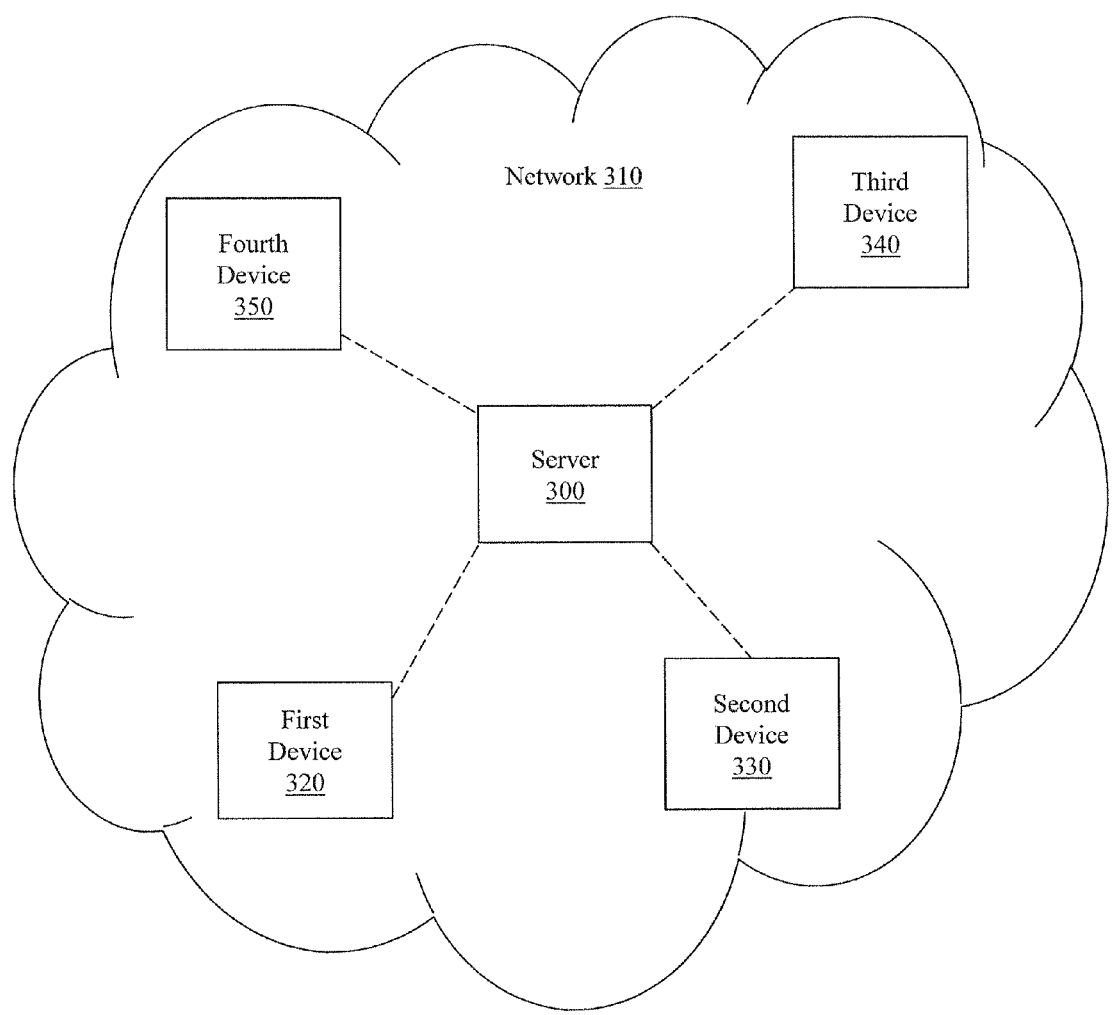
FIG. 3 illustrates one embodiment of a network in which example systems and methods, and equivalents, may operate.

Further aspects of intelligently routing messages in a network will be discussed in relation to FIG. 2. FIG. 2 illustrates a method 200 associated with intelligently routing messages between individuals that are members of a network. FIG. 2 will be discussed from the perspective of server 300 of FIG. 3. FIG. 3 illustrates a computing environment within which the method 200 may operate. For example, FIG. 3 illustrates a network 310 that includes the server 300, a first device 320, a second device 330, a third device 340, and a fourth device 350.

The network 310 is a social or other network that defines relationships between individuals that are members of the network 310. The network 310 is associated with an underlying communication network (e.g., PSTN, cellular phone network, Internet, and so on) that conveys electronic messages between the devices 320-350 and the server 300. The devices 320-350 are electronic devices that are each associated with an individual that is a member of the network 310. For example, the devices 320-350 can include cellular telephones, pagers, personal computers, laptops, and more generally any electronic device that an individual may use to communicate electronic messages to the server 300.

The server 300 operates according to method 200. Accordingly, the server 300 is configured to send and receive electronic messages over a communication network. For example, at 210, the server 300 receives a message from one of the devices 320-350. The message indicates an occurrence of an event. For example, the message may indicate an emergency, an alert, and so on. Alternatively, the message is a general communication or notice to one or more individuals in the network 310. In either case, the message is from a device (e.g., the first device 320) and is sent on behalf of a user of the device to the server 300. Additionally, the message may be addressed to specific individuals or groups in the network 310, or, the message may be addressed to the server 300.

At 220, the server 300 acquires engagement information from the network 310. The server 300 may acquire the engagement information in real-time in response to receiving the message at 210 or as an update that is not related to receiving the message at 210. In one embodiment, the server 300 polls devices (e.g., devices 330-350) in the network 310 to acquire the engagement information. Additionally, the server 300 may acquire the engagement information from information streams independently provided by each device or as a combination of both streaming data and polled data. In either case, the engagement information relates to attributes of members of the network 310.

For example, the engagement information can include several different types of information. The engagement information can include contextual information. The contextual information, in general, includes information that is time sensitive such as GPS coordinates, a current status (e.g., driving, in court, on patrol, in surgery, on vacation, etc.) and so on. Thus, the server 300 dynamically updates the contextual information in real-time upon receiving the message in order to ensure that the contextual information is up-to-date and accurate.

Furthermore, the engagement information also includes general characteristics of individuals (e.g., years of experience, current job title, and so on) and other statistical information (e.g., logs of past activity and associated averages). Accordingly, the server 300 keeps a running account of the statistical information. That is, the server 300 obtains and maintains data about the statistical information as events relevant to the statistical information occur. For example, the statistical information may include a statistical average how long an individual typically takes to respond to a message. Accordingly, the server 300 obtains information each time the individual receives a message about how long the individual spends between reception, viewing and response. The server 300 then maintains the information for use when assessing whether to send a message to the individual.

While the server 300 is discussed as acquiring the engagement information after block 210 and before block 230, of course, as the nature of the engagement information dictates, the server 300 may acquire the engagement information at many different times and simultaneous to other blocks (e.g., 210, 230-260) in the method 200. For example, the server 300 collects engagement information at block 250 upon determining whether the individual to which the message was forwarded to has yet responded. In yet another embodiment, instead of maintaining statistical information at the server 300, the devices 320-350 maintain the statistical information and provide the statistical information to the server 300 at 220.

Consider a scenario in which the network 310 is a network for a police department. Accordingly, the network 310 includes police officers, administrators, dispatchers and other individuals within and associated with the police department. Further consider that the message received by the server 300 at 210 is a request for backup by an officer associated with the first device 320. Accordingly, at 220, the server 300 acquires engagement information about other officers in the network 310. In this example, assume that the second device 330, the third device 340, and the fourth device 350 are each associated with an officer in the network 310.

Accordingly, the server 300 acquires the engagement information from the devices 330-350, at 220. The engagement information includes GPS coordinates for each device 330-350. For example, the second device 330 is at a location dented as b=110, the third device 340 is at b=50, and the fourth device 350 is at b=75. The message received from the first device 320 originally specifies a location of the requesting officer as a=100. Additionally, the engagement information also includes a number of bullets (e.g., in the range 0 to 100) that each officer is presently equipped with as determined by electronic bullet sensors in the devices 330-350. Thus, the second device 330 reports c=50, the third device 340 reports c=90, and the fourth device 350 reports c=25 to the server 300. In this way, the server 300 dynamically gathers engagement information in real-time in order to assess a likelihood or capability of each different officer responding.

At 230, the server 300 analyzes the network and the engagement information using a set of predefined metrics to produce response scores. In one embodiment, the server 300 applies one or more probability functions to the engagement information to determine a response score for each individual in the network 310. The response score indicates, for example, a likelihood that an individual will respond to the message that was sent from the particular user that originally transmitted the message.

In the example of the police department, the server 300 initially analyzes the network 310 by determining officers on patrol (e.g., 330-350) and acquiring the engagement information at 220 for the officers on patrol. In this way, the server 300 can assess which individuals are, for example, associated with the user (i.e., requesting officer) or are generally available in order to initially, for example, limit acquiring the engagement information at 220 to a limited subset of the network 310. Additionally, in this example, the message is not addressed to a specific individual or group of individuals. Instead, the server 300 determines a list of possible recipients and proceeds to collect information at 320 for individuals that are part of the list. In another embodiment, the message is addressed to one or more specific individuals in the network 310 and the server 300 may determine additional individuals that are possible recipients.

Accordingly, the server 300 proceeds at 230 by applying a probability function to the engagement information for the officers on patrol. The probability function is as follows:

$$p = f(a,b,c) = (1/|a-b|)*0.8 + (c/100)*0.2 \quad \text{Equation (2)}$$

Second Device 330, $p=(1/(1+|100-110|))*0.8+(50/100)*0.2=0.173$

Third Device 340, $p=(1/(1+|100-50|))*0.8+(90/100)*0.2=0.196$

Fourth Device 350, $p=(1/(1+|100-75|))*0.8+(25/100)*0.2=0.081$

Priority Ranking: (1) Third Device 340, (2) Second Device 330, (3) Fourth Device 350

As a result of the server 300 analyzing the engagement information at 230, the priority ranking is generated. The priority ranking, in this example, provides a ranking of officers that are most capable of responding at the time of the message.

Accordingly, at 240, the server 300 forwards the message to at least one individual based, at least in part, on the response scores. In the present example, the server 300 forwards the message to the third device 340 because the priority ranking lists an officer associated with the third device 340 as the most capable/likely to respond. In another embodiment, the server 300 forwards the message to the top two or more individuals listed in the priority ranking. The number of individuals to which the message is forwarded can be based on different conditions surrounding the message. For example, based on a severity/importance of the message more individuals can be forwarded the message.

Additionally, when the message includes a list of recipients, the server 300 may modify the list prior to sending out the message or send the message to recipients not even specified in the original list. That is, the server 300 may add individuals to the list or remove individuals from the list. The server 300 forwards the message, at 240, to one or more individuals according to the priority ranking and not according to the list of recipients specified in the message. Thus, when individuals originally specified as recipients in the message rank lower than another individual that may have been added by the server 300, then the original recipient that is lower ranking will not receive the message. In this way, the server 300 controls which individuals in the network 310 receive the message and routes the message to one or more individuals that are most likely/capable of responding.

At 250, the server 300 determines whether the at least one individual responded to the message. For example, if the officer associated with the third device 340 does not respond to the message or check the message within a predefined amount of time, then method 200 proceeds to 260.

At 260, the server 300 forwards the message to a next individual in the priority ranking (i.e., subset of individuals) when a previous individual did not respond within the predefined timeframe. In this way, the server 300 ensures that the message is routed to a most relevant individual and avoids blindly broadcasting the message to individuals in the network 310 that are not likely to respond. Accordingly, an overall message volume can be improved and, thus, fatigue from individuals in the network 310 receiving an overwhelming number of messages can also be improved.

Figure 4:
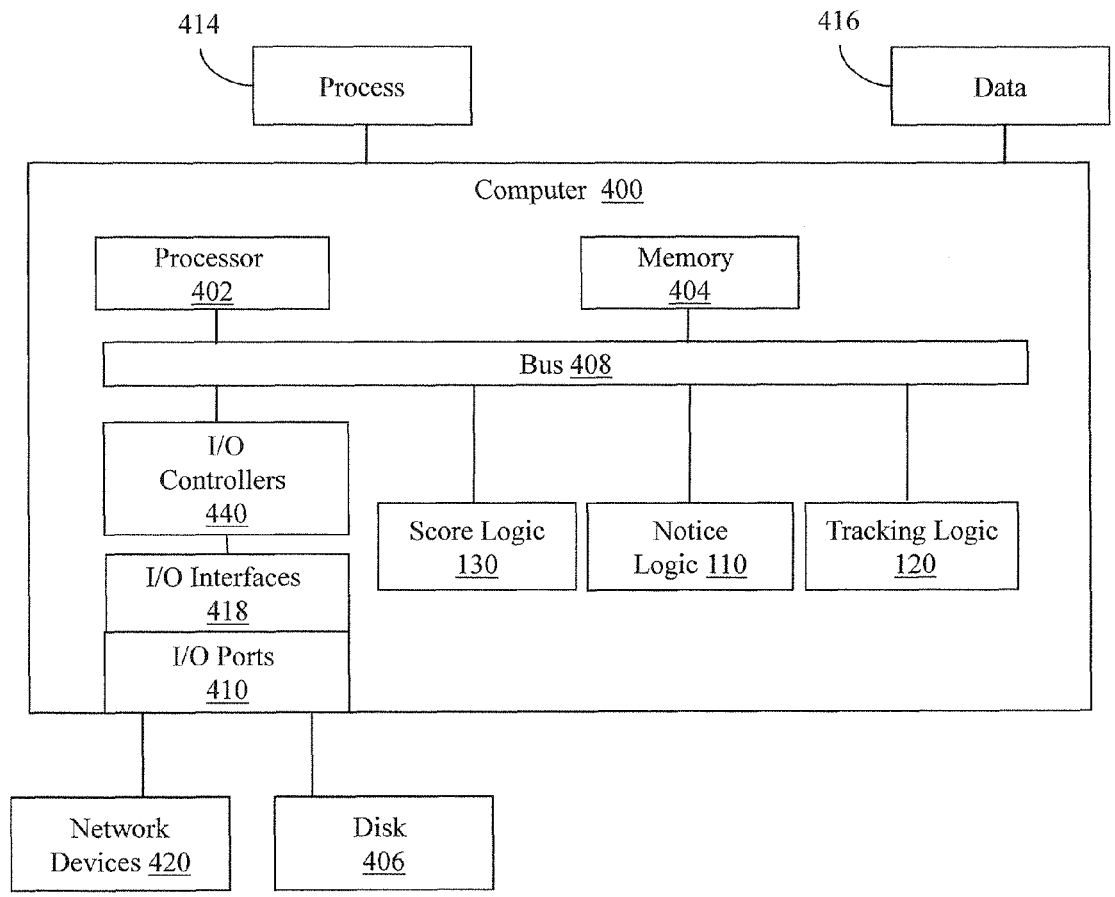
FIG. 4 illustrates an embodiment of a computing system configured with the example systems and/or methods.

FIG. 4 illustrates an example computing device that is configured and/or programmed with one or more of the example systems and methods described herein, and/or equivalents. The example computing device may be a computer 400 that includes a processor 402, a memory 404, and input/output ports 410 operably connected by a bus 408. In one example, the computer 400 is configured with notice logic 110 configured to receive and forward messages to and from individuals in a network. The computer 400 also includes tracking logic 120 configured to acquire engagement information about individuals in the network. The computer 400 further includes score logic 130 configured to analyze the engagement information and provide response scores that rank individuals that are most likely to respond to the message. In one embodiment, logics 110-130 are configured as their corresponding components shown and described in FIG. 1 and/or function as shown in FIG. 2. In different examples, the logics 110-130 may be implemented in hardware, a non-transitory computer-readable medium with stored instructions, firmware, and/or combinations thereof. While the logics 110-130 are illustrated as a hardware component attached to the bus 408, it is to be appreciated that in one example, the logics 110-130 could be implemented in the processor 402.

Generally describing an example configuration of the computer 400, the processor 402 may be a variety of various processors including dual microprocessor and other multiprocessor architectures. A memory 404 may include volatile memory and/or non-volatile memory. Non-volatile memory may include, for example, ROM, PROM, and so on. Volatile memory may include, for example, RAM, SRAM, DRAM, and so on.

A disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The bus 408 may be a single internal bus interconnect architecture and/or other bus or mesh architectures. While a single bus is illustrated, it is to be appreciated that the computer 400 may communicate with various devices, logics, and peripherals using other busses (e.g., PCIE, 1394, USB, Ethernet). The bus 408 can be types including, for example, a memory bus, a memory controller, a peripheral bus, an external bus, a crossbar switch, and/or a local bus.

The computer 400 may interact with input/output devices via the i/o interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the i/o interfaces 418, and/or the i/o ports 410. Through the network devices 420, the computer 400 may interact with a network. Through the network, the computer 400 may be logically connected to remote computers. Networks with which the computer 400 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer-readable medium described herein are limited to statutory subject matter under 35 U.S.C §101.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. A non-transitory computer-readable medium storing instructions that when executed by one or more processors cause the one or more processors to perform at least:
   receiving, by the one or more processors, an electronic message that indicates an occurrence of an event, wherein the electronic message is from a remote device and is sent on behalf of a user of the remote device;
   acquiring, by the one or more processors in response to receiving the electronic message indicating the event, engagement information about each of a plurality of individuals that are members of a network associated with the user, wherein the engagement information includes for each of the plurality of individuals (i) a location of an individual relative to the user, (ii) a capability for responding to the event, and (iii) an availability according to a schedule calendar of the individual;
   analyzing, by the one or more processors, the engagement information using a set of metrics to produce response scores for at least a subset of the plurality of individuals, wherein a response score for each individual is an indicator of a likelihood of responding to the message;
   ranking, by the one or more processors, the subset of the plurality of individuals according to the response scores to generate an ordered list;
   controlling, by at least the one or more processors, distribution and routing of the electronic message by routing the electronic message over a communication network to at least one remote device associated with at least one individual in accordance with the ranking in the ordered list;
   after routing the electronic message, determining whether the at least one individual responded to the electronic message; and
   routing the electronic message to a next individual in the subset from the ordered list if the at least one individual does not respond to the electronic message within a defined timeframe.

2. The non-transitory computer-readable medium of claim 1, wherein forwarding the message based, at least in part, on the response scores routes the message to an individual in the network that is most likely to respond to the message.

3. The non-transitory computer-readable medium of claim 1, wherein the engagement information further includes a response history that indicates how many times an individual has responded to previous messages, a check rating that indicates a history of how quickly an individual has checked previous messages, and a relationship to the user as defined by the network.

4. The non-transitory computer-readable medium of claim 1, wherein analyzing the engagement information using the set of metrics to produce the response scores includes calculating the response scores and ranking the subset of individuals to generate the ordered list according to the response scores, and wherein the ordered list lists individuals in the subset of individuals according to each individuals likelihood of responding to the electronic message.

5. The non-transitory computer-readable medium of claim 1, wherein the network is a social network of the user that includes individuals associated with the user and a relationship of each individual with the user.

6. The non-transitory computer-readable medium of claim 1, wherein the metrics include one or more functions that define a heuristic for determining the likelihood that an individual will respond to the electronic message based, at least in part, on the engagement information and a relationship between the individual and the user defined by the network.

7. The non-transitory computer-readable medium of claim 1, wherein the electronic message is automatically generated by the remote device upon the occurrence of the event, and wherein the event is a medical emergency, a medical notification, or an emergency notification.

8. The non-transitory computer-readable medium of claim 1, wherein controlling distribution and routing of the electronic message to the at least one individual includes selecting the at least one individual from the ordered list as an individual that is most likely to respond to the electronic message.

9. A non-transitory computer-readable medium storing instructions that when executed by one or more processors cause the one or more processors to perform at least:
   receiving, by the one or more processors, an electronic message that indicates an occurrence of an event, wherein the electronic message is from a remote device and is sent on behalf of a user of the remote device;
   acquiring, by the one or more processors, engagement information about each of a plurality of individuals that are members of a network associated with the user, wherein the engagement information is acquired in real-time as the message is received from the user, and wherein the engagement information includes contextual information about each of the plurality of individuals;
   wherein acquiring the engagement information includes continuously acquiring the engagement information in real-time by receiving streams of information from electronic devices associated with each of the plurality of individuals, wherein acquiring the engagement information collects the contextual information from the plurality of individuals, and wherein the contextual information includes a status of each of the plurality of individuals, a location of each of the plurality of individuals, a capability of each of the plurality of individuals, and an availability according to a calendar of scheduled events of each of the plurality of individuals;
   analyzing, by the one or more processors, the network and the engagement information using a set of predefined metrics to produce response scores for at least a subset of the plurality of individuals to generate an ordered list of the subset based on the response scores;
   controlling, by at least the one or more processors, distribution and routing of the electronic message by routing the electronic message over a communication network to at least one remote device associated with at least one individual in accordance with the ordered list;

after routing the electronic message, determining whether the at least one individual responded to the electronic message; and routing the electronic message to a next individual in the subset from the ordered list if the at least one individual does not respond to the electronic message within a defined timeframe.

10. A computing system, comprising:

a processor;

a non-transitory computer-readable medium storing logics that are executable by the processor, the logics including:

a notice logic configured to cause at least the processor to receive an electronic message that indicates an occurrence of an event, wherein the electronic message is from a remote device and is sent on behalf of a user of the remote device;

tracking logic configured to cause at least the processor to acquire, in response to receiving the electronic message indicating the event, engagement information about each of a plurality of individuals that are members of a network associated with the user, wherein the engagement information includes for each of the plurality of individuals (i) a location of an individual, (ii) a capability for responding to the event, and (iii) an availability according to a schedule calendar of the individual; and score logic configured to cause at least the processor to analyze the engagement information using a set of metrics to produce response scores for at least a subset of the plurality of individuals, wherein a response score for each individual is an indicator of a likelihood of responding to the electronic message, and to rank the subset of the plurality of individuals according to the response scores to generate an ordered list;

wherein the notice logic is configured to cause at least the processor to:

route the electronic message over a communication network to a device associated with at least one individual in the subset that is selected from the subset of the plurality of individuals according to the rank in the ordered list of which individuals in the subset are scored as most likely to respond;

after routing the electronic message, determine whether the at least one individual responded to the electronic message; and route the electronic message to a next individual from the ordered list if the at least one individual does not respond to the electronic message within a defined timeframe.

11. The computing system of claim 10, wherein the notice logic is configured to route the electronic message by routing the electronic message to an individual in the network that is most likely to respond to the electronic message.

12. The computing system of claim 10, wherein the tracking logic is configured to acquire the engagement information by dynamically and continuously acquiring the engagement information in real-time from streams of information received from electronic devices associated with each of the plurality of individuals.

13. The computing system of claim 10, wherein the engagement information includes a response history that indicates how many times an individual has responded to previous messages, a check rating that indicates a history of how quickly an individual has checked previous messages, or a relationship to the user as defined by the network.

14. The computing system of claim 10, wherein the score logic is configured to analyze the engagement information using the set of metrics to produce the response scores by calculating the response scores and ranking the subset of individuals to provide a priority ranking according to the response scores, and wherein the priority ranking lists individuals in the ordered list according to each individuals likelihood of responding to the electronic message.

15. The computing system of claim 10, wherein the network is a social network of the user that includes individuals associated with the user and a relationship of each individual with the user.

16. The computing system of claim 10, wherein the set of metrics include one or more functions that define a heuristic for determining the likelihood that an individual will respond to the electronic message based, at least in part, on the engagement information.

17. The computing system of claim 10, wherein the notice logic receives the electronic message upon the electronic message being automatically generated by the remote device upon the occurrence of the event, wherein the event is a medical emergency, a medical notification, or an emergency notification.

18. A method performed by a computing device including at least a processor, the method comprising:

in response to receiving an electronic message that indicates an occurrence of an event and indicates a user:

acquiring, by the processor in real-time, engagement information about each of a plurality of individuals that are members of a network associated with the user, wherein the engagement information includes for each of the plurality of individuals (i) a location of an individual, (ii) a capability for responding to the event, and (iii) an availability according to a schedule calendar of the individual;

analyzing, by the processor, the engagement information using a set of metrics to determine a probability that each individual of the plurality of individuals will respond to the electronic message;

ranking, by at least the processor, the plurality of individuals according to the probability to generate an ordered list of the plurality of individuals;

selecting, by at least the processor, at least one individual from the ordered list as a function of the ranking of the probabilities;

routing the message, by at least the processor via an electronic communication, to at least one device associated with the at least one individual selected as a function of the ranking of the probability that the at least one individual will respond to the message;

after routing the electronic message, determining whether the at least one individual responded to the electronic message; and routing the electronic message to a next individual in the ranking from the ordered list if the at least one individual does not respond to the electronic message within a defined timeframe.

* * * * *